United States Patent
Shapiro et al.

(10) Patent No.: US 9,921,714 B1
(45) Date of Patent: Mar. 20, 2018

(54) GRAPHICAL METHOD TO SELECT FORMATS

(71) Applicants: Geoffrey A. Shapiro, Cedar Rapids, IA (US); David L. Leedom, Center Point, IA (US); David A. Gribble, Cedar Rapids, IA (US); Carl H. Bode, Atkins, IA (US)

(72) Inventors: Geoffrey A. Shapiro, Cedar Rapids, IA (US); David L. Leedom, Center Point, IA (US); David A. Gribble, Cedar Rapids, IA (US); Carl H. Bode, Atkins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 286 days.

(21) Appl. No.: 13/947,737

(22) Filed: Jul. 22, 2013

(51) Int. Cl.
    *G06F 3/048* (2013.01)
    *G06F 3/0481* (2013.01)
    *G06F 3/0486* (2013.01)
    *G06F 3/0488* (2013.01)

(52) U.S. Cl.
    CPC ........ *G06F 3/04817* (2013.01); *G06F 3/0486* (2013.01); *G06F 3/04886* (2013.01); *G06F 2203/04803* (2013.01)

(58) Field of Classification Search
    CPC ....... G06F 3/04817; G06F 2203/04803; G06F 3/0486; G06F 3/04886; G01C 23/00
    See application file for complete search history.

(56) References Cited

U.S. PATENT DOCUMENTS

| | | | | |
|---|---|---|---|---|
| 6,466,235 | B1 * | 10/2002 | Smith et al. | 715/771 |
| 6,512,527 | B1 * | 1/2003 | Barber et al. | 715/764 |
| 7,231,602 | B1 * | 6/2007 | Truelove | G06F 17/214 715/205 |
| 8,937,744 | B1 * | 1/2015 | Shah et al. | 358/1.2 |
| 9,134,891 | B1 * | 9/2015 | Schultz | G01C 23/00 |
| 2004/0210847 | A1 * | 10/2004 | Berson et al. | 715/788 |
| 2010/0257446 | A1 * | 10/2010 | Woolfe et al. | 715/274 |
| 2012/0023157 | A1 * | 1/2012 | Roth | H04L 67/306 709/203 |
| 2012/0236037 | A1 * | 9/2012 | Lessing et al. | 345/661 |
| 2013/0222321 | A1 * | 8/2013 | Buening | 345/173 |

(Continued)

FOREIGN PATENT DOCUMENTS

KR 101007969 B1 * 1/2011

*Primary Examiner* — Andrew T Chiusano
(74) *Attorney, Agent, or Firm* — Angel N. Gerdzhikov; Donna P. Suchy; Daniel M. Barbieri (57) ABSTRACT

The present disclosure is directed to a method for managing a graphical interface viewable on a display. The method may include the step of presenting a plurality of layout options, a layout option is at least one of a full window layout or a divided window layout. The method may also include the step of receiving a selection of a layout option from the plurality of layout options. A further step of the method includes presenting a preview of the selected layout option on the display. The method also includes the step of presenting a plurality of icons, each icon corresponding to an application. A further step of the method includes receiving a selection of an icon for display within the selected layout option, the selected icon being compatible for display in the selected layout option.

18 Claims, 11 Drawing Sheets

(56) References Cited

U.S. PATENT DOCUMENTS

| | | | | |
|---|---|---|---|---|
| 2014/0109080 A1* | 4/2014 | Ricci | ............ | G06F 8/61 717/174 |
| 2014/0337794 A1* | 11/2014 | Vranjes et al. | ............ | 715/800 |
| 2014/0351748 A1* | 11/2014 | Xia et al. | ............ | 715/798 |

* cited by examiner

GRAPHICAL METHOD TO SELECT FORMATS

TECHNICAL FIELD

The present disclosure generally relates to the field of flight display applications and more particularly to a graphical method to select formats on a display.

BACKGROUND

Currently, the process for a user such as a pilot to change a format of a graphical display for one of the systems on an aircraft may be complex. For example, a change to the format of the display may be controlled by multiple controls and locations. The operation of these controls and systems may be inconsistent. Similarly, the existing controls and systems may not be intuitive and may entail considerable training time. In addition, the workload on the pilot in managing the displays can be considerable and may entail substantial heads-down operation.

Therefore, there exists a need for improved systems and methods for managing graphical displays on an aircraft.

SUMMARY

The present disclosure is directed to a method for managing a graphical interface viewable on a display. The method may include the step of presenting a plurality of layout options, a layout option is at least one of a full window layout or a divided window layout. The method may also include the step of receiving a selection of a layout option from the plurality of layout options. A further step of the method includes presenting a preview of the selected layout option. The method also includes the step of presenting a plurality of icons, each icon corresponding to an application. A further step of the method includes receiving a selection of an icon for display within the selected layout option, the selected icon being compatible for display in the selected layout option.

The present disclosure is also directed to a system including a processor, memory, and a display. The memory includes a computer executable program code stored on the memory and configured to execute on the processor. The computer executable program code is configured for presenting a plurality of layout options and receiving a selection of a layout option from the plurality of layout options. The computer executable program code is further configured for presenting a preview of the selected layout option on the display as well as a plurality of icons. Each icon corresponds to an application. The computer executable program code is further configured for receiving a selection of an icon for display within the selected layout option, the selected icon being compatible for display in the selected layout option.

The present disclosure is also directed to a computer-readable device having computer-executable instructions for performing a method for managing a graphical interface viewable on a display. The instructions may include the step of presenting a plurality of layout options, a layout option is at least one of a full window layout or a divided window layout. The instructions may also include the step of receiving a selection of a layout option from the plurality of layout options. A further step of the instructions may include presenting a preview of the selected layout option. The instructions also include the step of presenting a plurality of icons, each icon corresponding to an application. A further step of the instructions may include receiving a selection of an icon for display within the selected layout option, the selected icon being compatible for display in the selected layout option.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Existing methods for managing display formats on an aircraft may entail the use of several controls for the various aircraft systems. These controls may not be cohesive and may be positioned in separate locations within the flight deck. For example, existing systems may require using a cursor control panel to control a multi-function display and a control display unit for controlling flight management system content. Similarly, the display control panel is used to control the primary flight display format and the cursor control panel may include menu buttons which are used to control the upper and lower windows of the multi-function display. The cursor control panel is also used for the full screen mode on a multifunction display. The control display unit may also be used for the flight management system content. Based on these examples, multiple input and control mechanisms are required in order to manage the various systems on the flight deck.

In addition, the process for changing a display configuration and content displayed on the displays associated with the systems on board the aircraft may require several steps. In one example, 10 separate steps may be required in order to change a display from a full screen display for a four quarter display for displaying four different applications.

Figure 1:
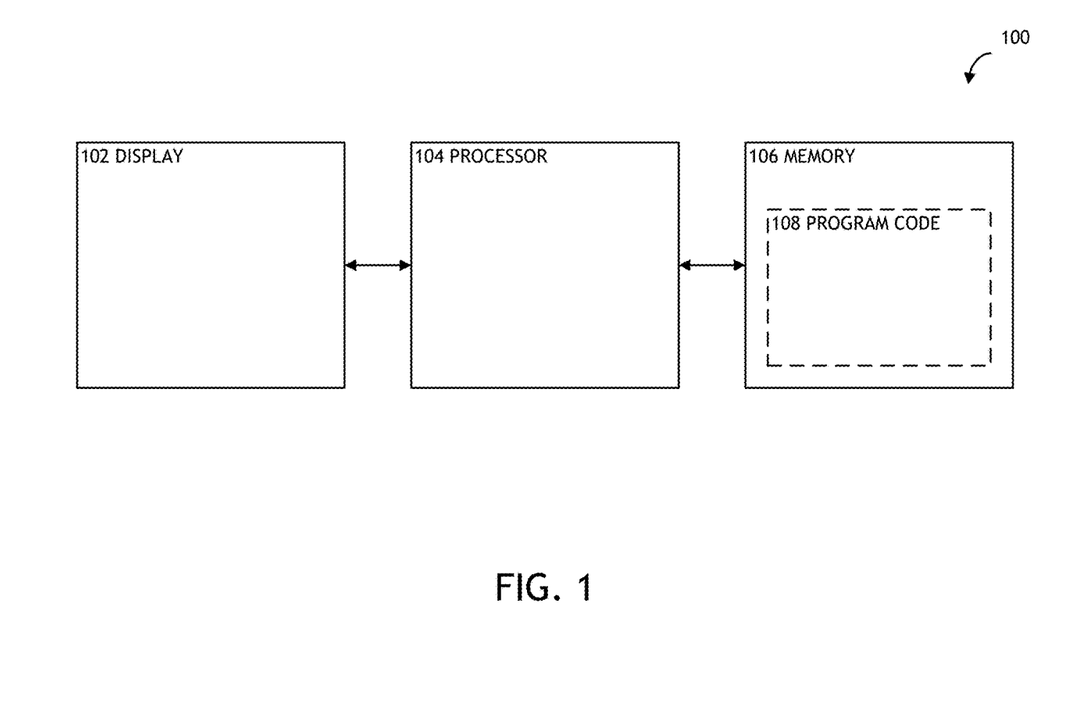
FIG. 1 is a diagram of a system for managing a graphical user interface.
Figure 2:
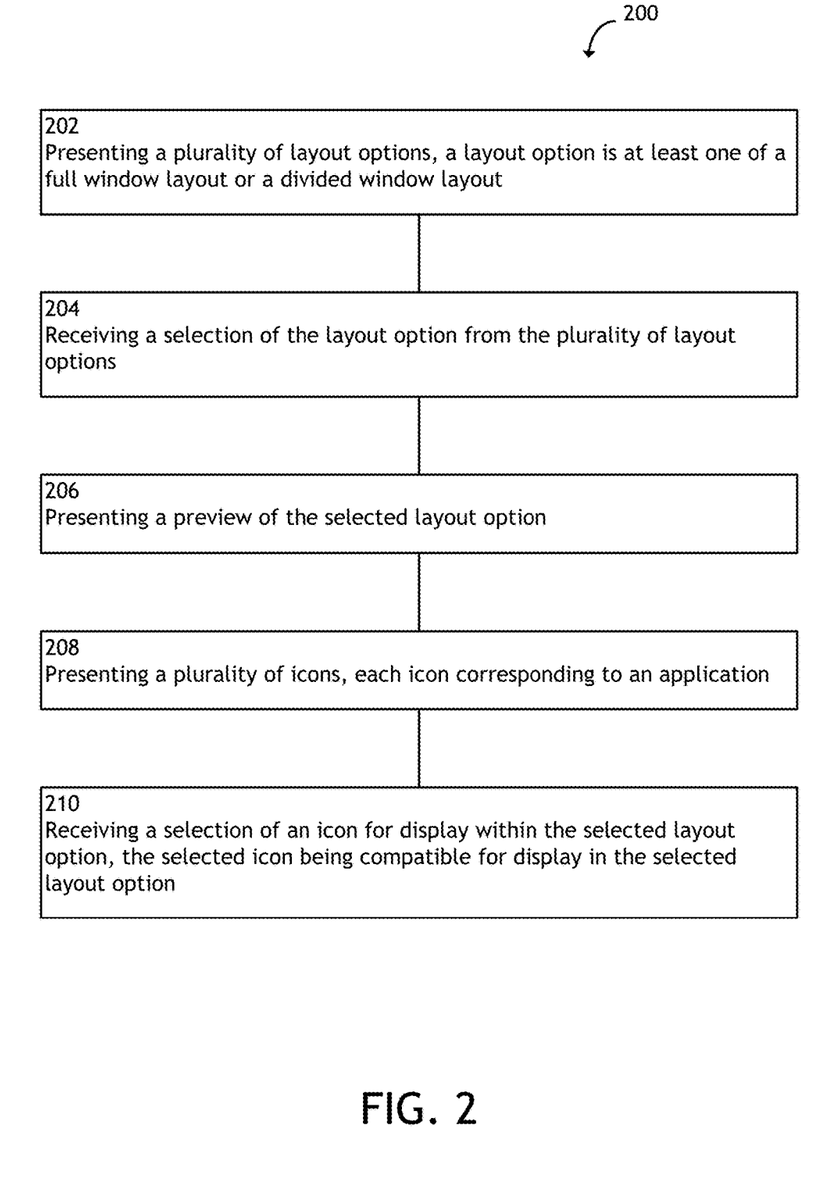
FIG. 2 is a flow diagram of a method for managing a graphical user interface.

The present disclosure is directed to systems and methods for managing a graphical interface viewable on a display. Referring generally to FIG. 1, system 100 including display 102, processor 104, and memory 106 configured for storing program code 108. The program code 108 is configured to execute on the processor 104. The program code is configured to perform a method 200 for managing a graphical interface viewable on a display 102 when executed on the processor 104. The method 200 is provided in FIG. 2 and may include the step of presenting a plurality of layout options on the display 202. The method 200 may also include the step of receiving a selection of a layout from the plurality of layout options 204. A further step of the method 200 includes displaying a preview of the selected layout option 206. The method 200 may also include the step of presenting a plurality of icons, each icon corresponding to an application 208. The method 200 may also include the step of receiving a selection of at least one icon for display within the selected layout option, the at least one icon being compatible for display in the selected layout option 210.

The processor 104 of the system 100 shown in FIG. 1 may include any suitable computer processor capable of storing computer code that, when executed by processor 104, causes processor 104 to perform a method for managing a graphical interface viewable on a display 102.

The memory 106 of the system 100 shown in FIG. 1 may include a storage memory configured to store the computer executable program code 108 as well as other data. The memory 106 may include any system and/or device capable of storing data. The system 100 shown in FIG. 1 may also include a user input system configured to receive an input from a user such as a pilot.

Figure 3:
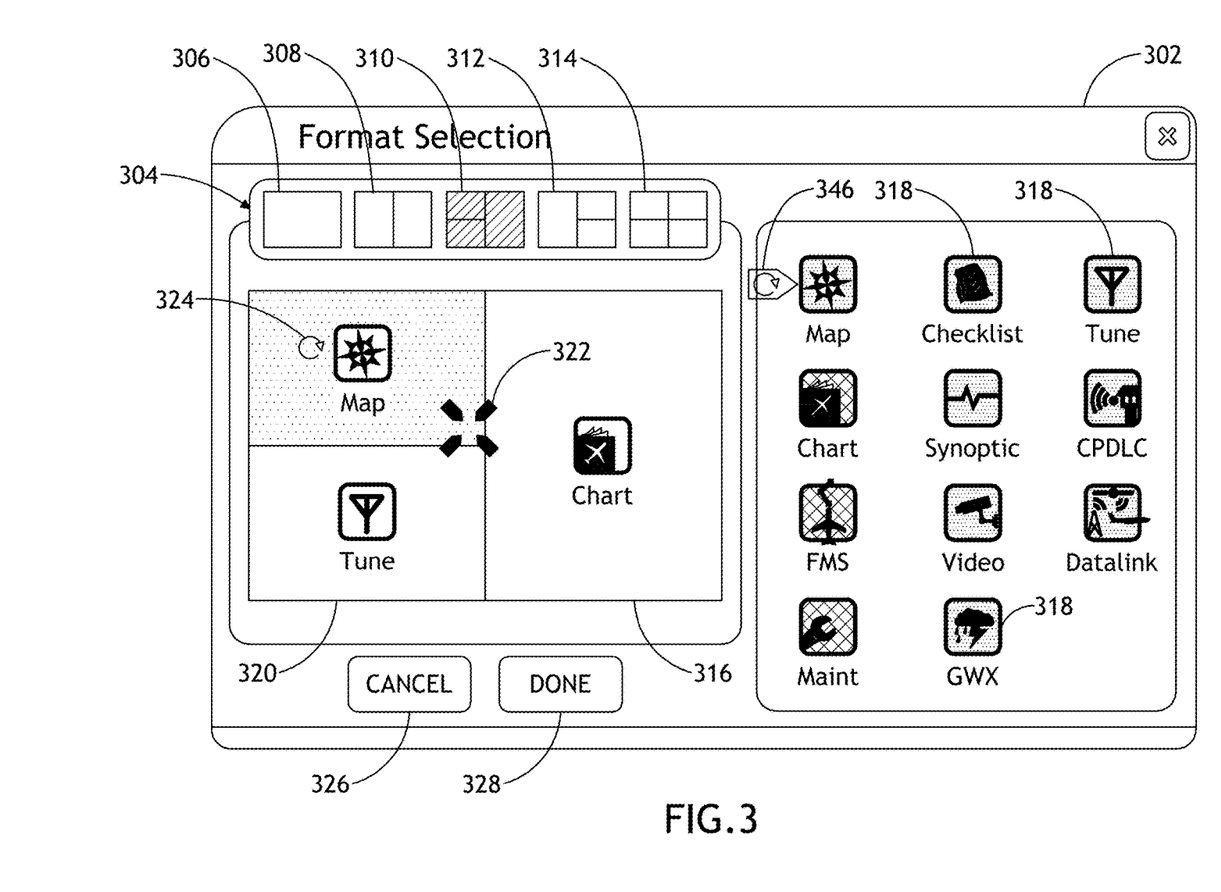
FIG. 3 is a view of a format selection dialog box of a graphical user interface.
Figure 4:
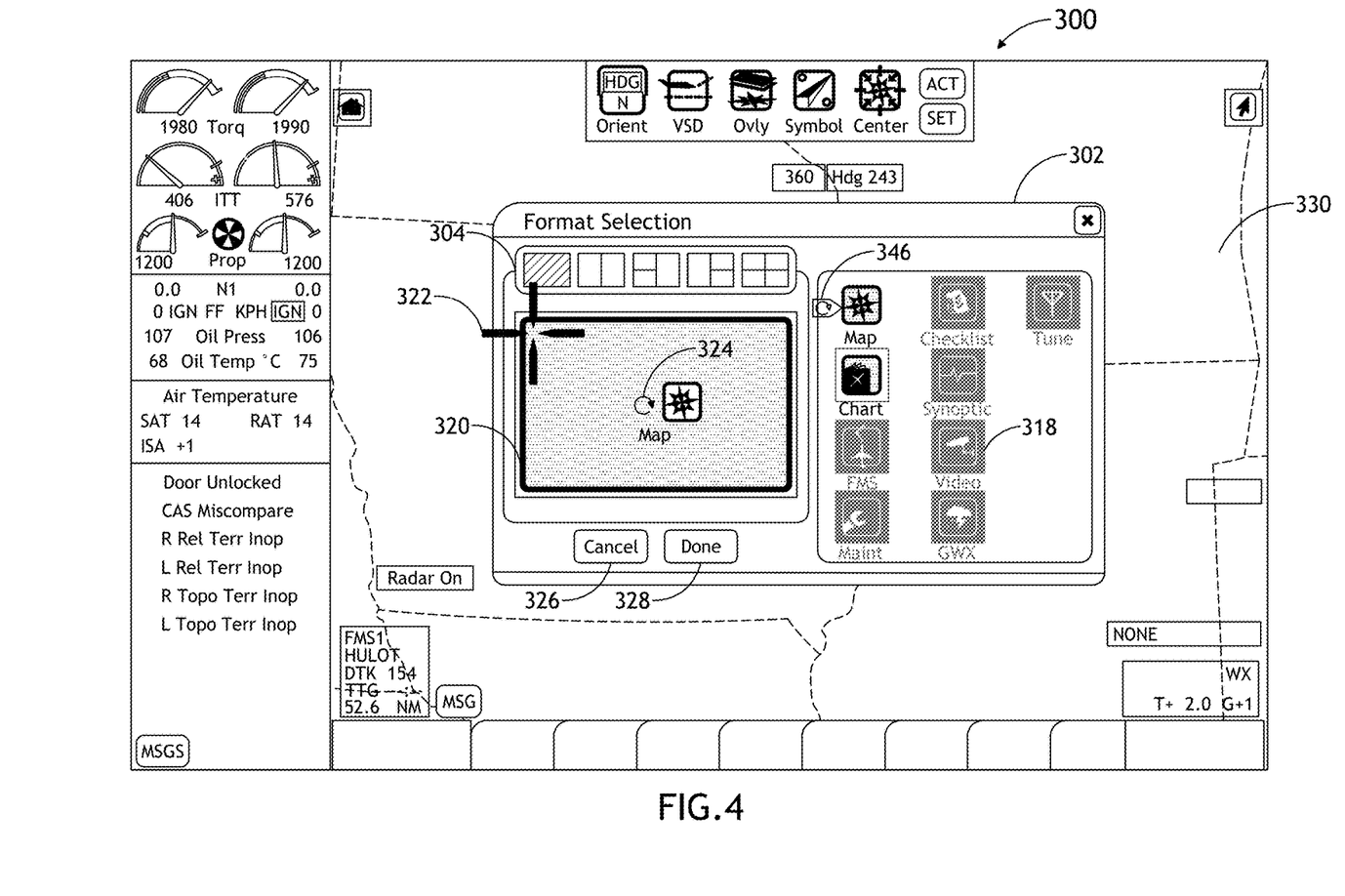
FIG. 4 is a view of a full window layout of a graphical user interface including a preview of a mapping application.

Examples of the content that may be provided using the system 100 and according to the method 200 are provided in FIGS. 3-10. Referring generally to FIG. 3, a graphical interface 300 which may be provided using the system 100 is shown. The graphical interface 300 may be used to select a layout and at least one application to be run on the display. Examples of the application may include a mapping application, a checklist application (such as, for example an Electronic Checklist for an aircraft), a tuning application, a charting application, a synoptic application, a Controller-Pilot Data Link Communication application, a flight management system, a video application, a data link application, a maintenance application, a graphical weather application, a document reader application, any application using eCDU format (FANS/Link 2000), a Primary Flight Display (PFD) application, or any other application that may be desired. Those skilled in the art will appreciate that the forgoing list is not intended to be limiting and is merely exemplary. Any suitable application may be used on the graphical interface 300 and the disclosure is not limited to the examples provided.

Referring generally to FIG. 3, a format selection dialog box 302 of the graphical interface 300 is provided. The format selection dialog box 302 allows a user to select a layout option from a plurality of layout options as well as at least one application to be run on the display. The format selection dialog box 302 may present a plurality of layout options 304 to the user. The plurality of layout options 304 will dictate the layout of the graphical user interface 300.

The layout options 304 may include either a full window layout or a divided or multi-window layout. In the embodiments shown in FIGS. 3-10, the plurality of layout options 304 may include a full window layout option 306, a two half windows layout option 308, a two quarter and half window layout option 310, a half and two quarter window layout option 312, and a four quarter window layout 314. Although the forgoing layout options are shown in FIGS. 3-10, these layout options are merely exemplary and not intended to be limiting. Other layout options, including options with different configurations and numbers of windows, may be used depending on the system requirements, applications to be run and other factors.

In FIG. 3, the format selection dialog box 302 presents the layout options 304 and a user selects the two quarter and half layout option 310. Based on this selection, the format selection dialog box 302 displays the selected layout 316 on a left side of the format selection dialog box 302.

On a right side of the format selection dialog box 302, a plurality of icons 318 are shown. Each icon 318 represents a corresponding application which may be run on the display. The applications are compatible with particular layout options 304, and not all applications may be compatible with all layout options 304. The compatibility of an application within a particular layout option 304, or within a particular window 320 of a layout option 304, may depend on a variety of factors including the application type, window size, and other factors. The compatibility of an application may be predetermined in one embodiment.

Based on the layout option 304 that is selected, the icons 318 are enabled or disabled by the processor depending on their compatibility with the selected layout option. If an icon 318 is compatible with a selected layout 316, the icon 318 will be enabled. If the icon 318 is not compatible with the selected layout, the icon 318 may be disabled and made not selectable by the user. In FIGS. 3-10, the icons 318 that are enabled are shown in bold and/or highlighted, whereas the icons 318 that are not enabled may be shown in grey. For example, in FIG. 4, an example full window layout 306 is shown. In the full window layout 306, a map icon 318 or a chart icon 318 may be displayed, and are shown in bold. The remaining icons 318, including the icons for the checklist, tune, synoptic, FMS (flight management system), video, maintenance, and GWX (weather application) are not compatible with the full window layout 306, and are therefore not enabled, as indicated by the lack of highlighting in FIG. 4. Other methods of indicating the compatibility of an icon 318 within a selected layout 316 may also be used, such as for example, a color indicator or the like.

In some embodiments, the selected layout 316 may include two or more windows 320. For example, the half window layout option 308 (shown in FIG. 5), two quarter and half window layout option 310 (shown in FIG. 3), half and two quarter window layout option 312 (shown in FIG. 7), and the four quarter window layout 314 (shown in FIG. 8) each include between two and four windows 320. In the layout options 304 including two or more windows 320, an icon 318 may be compatible in the layout, but only in a particular window 320 or windows 320 of the selected layout 316. For example, the icon 318 may be compatible in one window 320 of the selected layout 316 but incompatible in another window 320 of the selected layout 316. FIG. 3 shows an example of an indication that may be included on the icon 318 to show the compatibility of the icon 318 within a selected window 320 or a non-selected window 320 of a selected layout 316. For example, in FIG. 3 the selected window 320 is indicated by cursor 322. The map icon 318 is currently in the selected window 320 and the icons 318 on the right side of the format selection box 302 are all compatible and enabled within the selected layout 316 and are shown in bold. However, only some of the icons 318 are compatible within each window 320 of the selected layout 316. The icons 318 that are compatible within the selected window 320 of the selected layout 316 of FIG. 3 include map, checklist, tune, synoptic, CPDLC, video, datalink, and GWX. These compatible icons may be shown in the same color on the graphical user interface 300, or in the example shown in FIG. 3, the icons each include a dotted pattern within the icon 318. The icons 318 that are compatible within the selected layout 316, but not in the selected window 320 may be shown in a different color, or with a different pattern than the other icons. In FIG. 3, the icons for chart, FMS, and maintenance are compatible within a different window of the selected layout 316 and this is indicated using a hashing pattern within the icon 318.

A user, such as a pilot, may select the format as well as the icons 318 corresponding to the windows 320 of the selected format 316 and provide other input as desired using any suitable input system. For example, user input may be provided via a tactile feedback system, a haptic technology system, a touch screen, a multi-touch surface, a pressure-triggered screen with a stylus, a keyboard, a cursor control panel, or a mouse. Similarly, user input may be provided via a combination of these devices.

Figure 9:
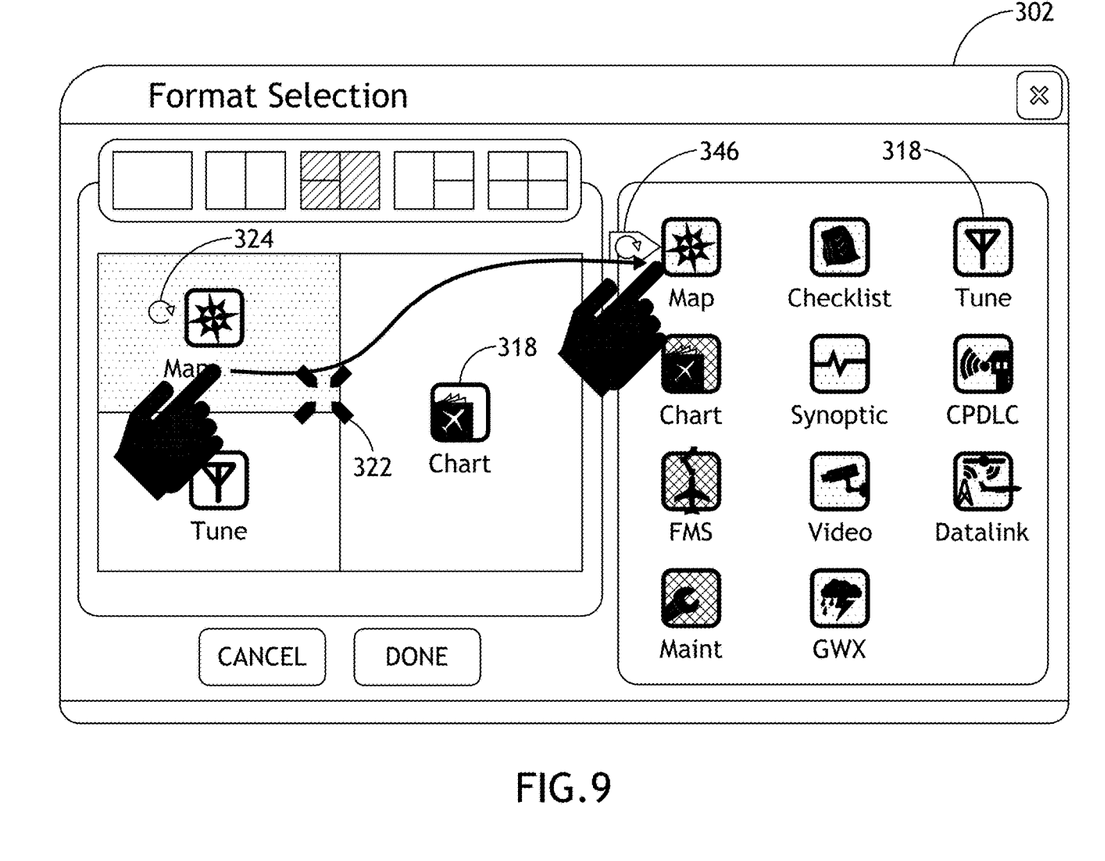
FIG. 9 is a view of touch-touch selection process for configuring a graphical user interface.

FIG. 9 shows an example of how a user may provide input via a touch screen. In FIG. 9, the user may wish to select the icon 318 for display within the upper left window 320 of the selected layout 316. Using a touch-touch input method, the user selects the desired window 320 and then selects the desired icon 318 for placement in that window. In FIG. 9, the desired icon 318 is the map icon.

Figure 10:
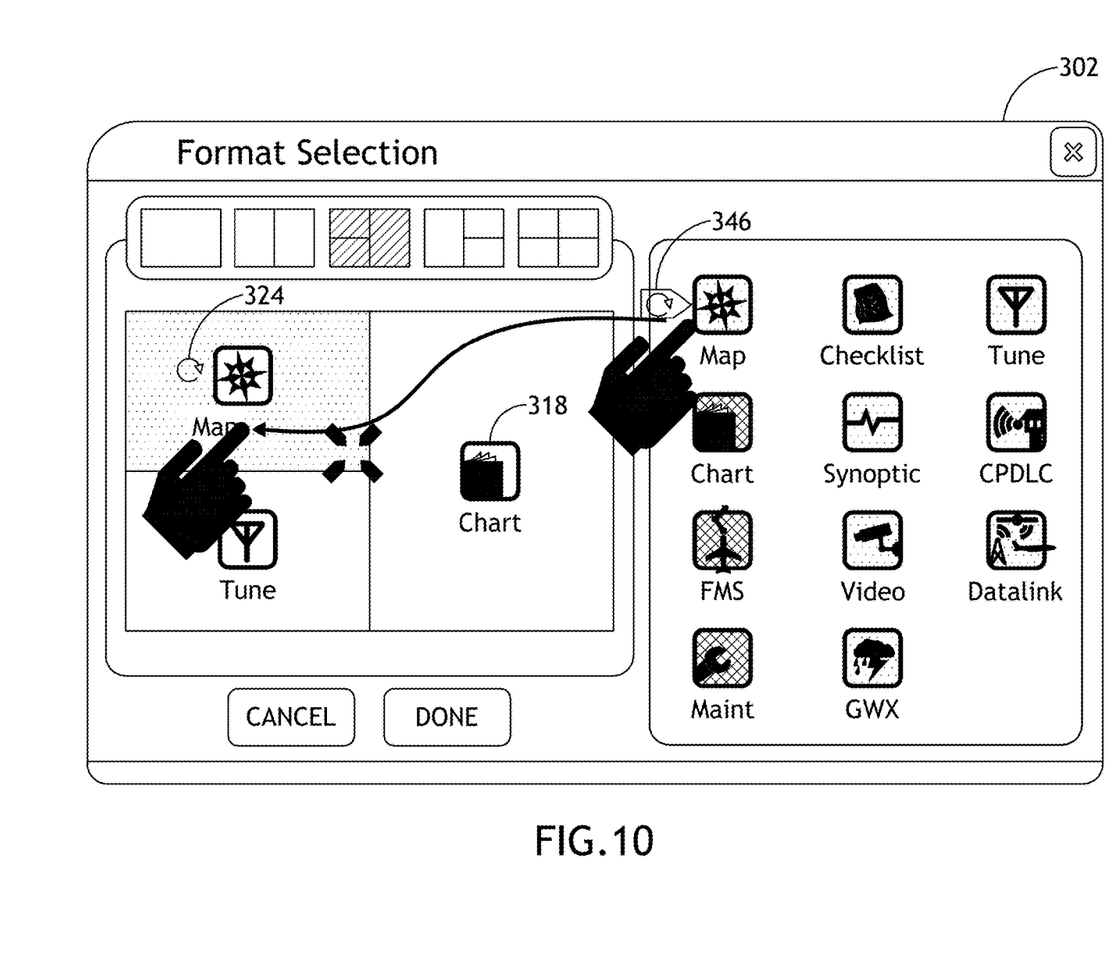
FIG. 10 is a view of touch and drag selection process for configuring a graphical user interface.

FIG. 10 shows a drag and drop method of providing input to the graphical interface 300 incorporating a touch screen. In this example, the user wishes to populate the upper left hand corner window 320 of the selected layout 316. The user identifies the desired icon 318 from the list of icons 318 and touches it, then drags and drops it into the desired window 320.

Figure 11:
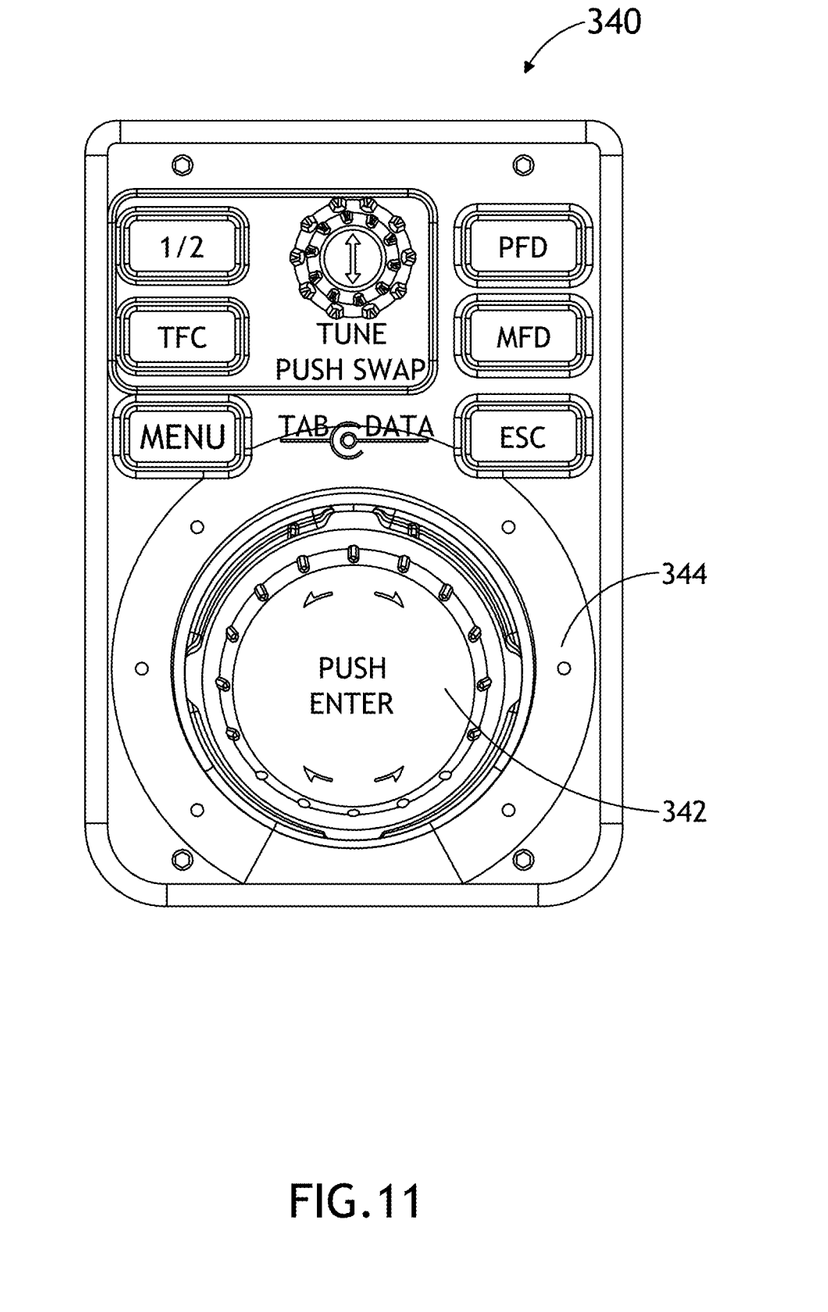
FIG. 11 is an example input system including a rotary knob.

A user may also provide input to the system using a control panel based input such as a rotary knob 340, as shown in FIG. 11. The touch-touch method, touch and drag method, and rotary knob method for providing input to the graphical interface are merely exemplary, and any suitable input system may be used. Similarly, multiple input types may be used within the same graphical interface. For example, a user may provide input via either the touch screen method (touch-touch or touch and drag) or another input method on the same interface.

When the user uses a control panel input method to provide input (for example, using the rotary knob shown 340 in FIG. 11), the graphical interface 300 may be controlled via an inner knob 342 and an outer knob 344. The inner knob 342 may be used to scroll through the icons 318 and the outer knob 344 may be used to control cursor 322 to change the window 320 selection. Feedback may be provided on the graphical interface 300 based on the selections. For example, a first arrow 324 may be displayed in a current window 320. The first arrow 324 may be located adjacent to a selected icon 318 for the current window 320. In FIG. 3, for example, the current window 320 has a first arrow 324 located adjacent to the map icon 318 in window 320. A second arrow 346 may be presented next to the corresponding map icon 318 on the right side of the format selection box 302. If the user wishes to tab through the icons 318 to select a different icon 318, the user may use the inner knob 342 and the second arrow 346 may advance through the list of icons 318. For example, in FIG. 3, the user may preview the icon 318 options and advance from map, to checklist, to tune. Similarly, the outer knob 344 of the rotary knob 340 may be used to move the cursor 322 and select a different window 320.

The display may also be configured to provide a preview 330 of the selected layout 316 and the application associated with the selected icons 318 to the user. Referring generally to FIGS. 4-8, examples of the preview 330 feature are provided. For example, in FIG. 4, the selected layout 316 is a full screen layout 306 and the selected icon 318 is the map icon. The mapping application associated with the map icon is then displayed on the graphical user interface 300. In the embodiment shown in FIG. 4, the mapping application is shown behind the format selection box 302. The preview 330 function allows a user to view how the selected layout 316 and the selected applications will appear before the user commits to the selections.

Figure 5:
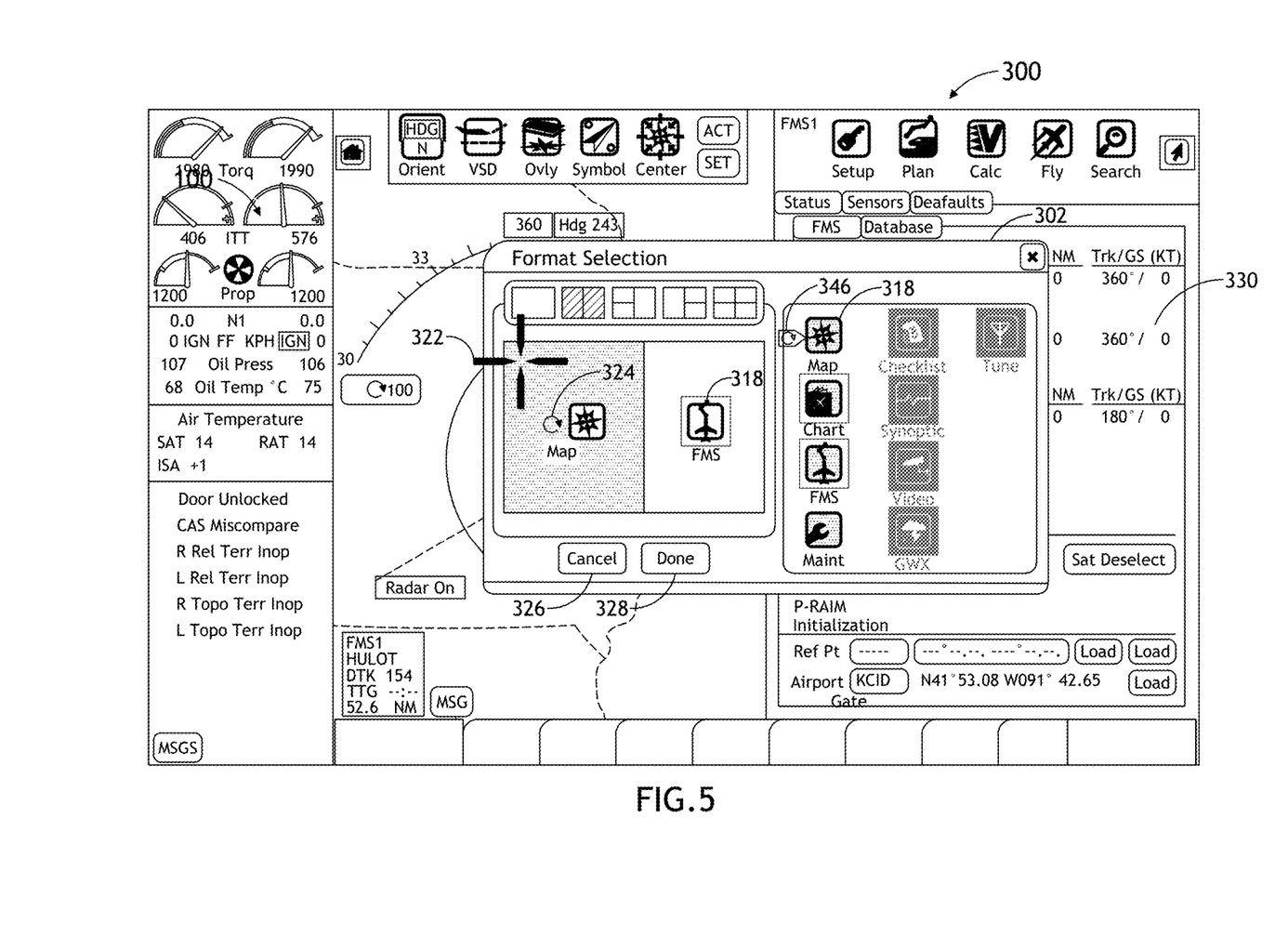
FIG. 5 is a view of a two half windows layout of a graphical user interface including a preview of a mapping application and a flight management system.
Figure 6:
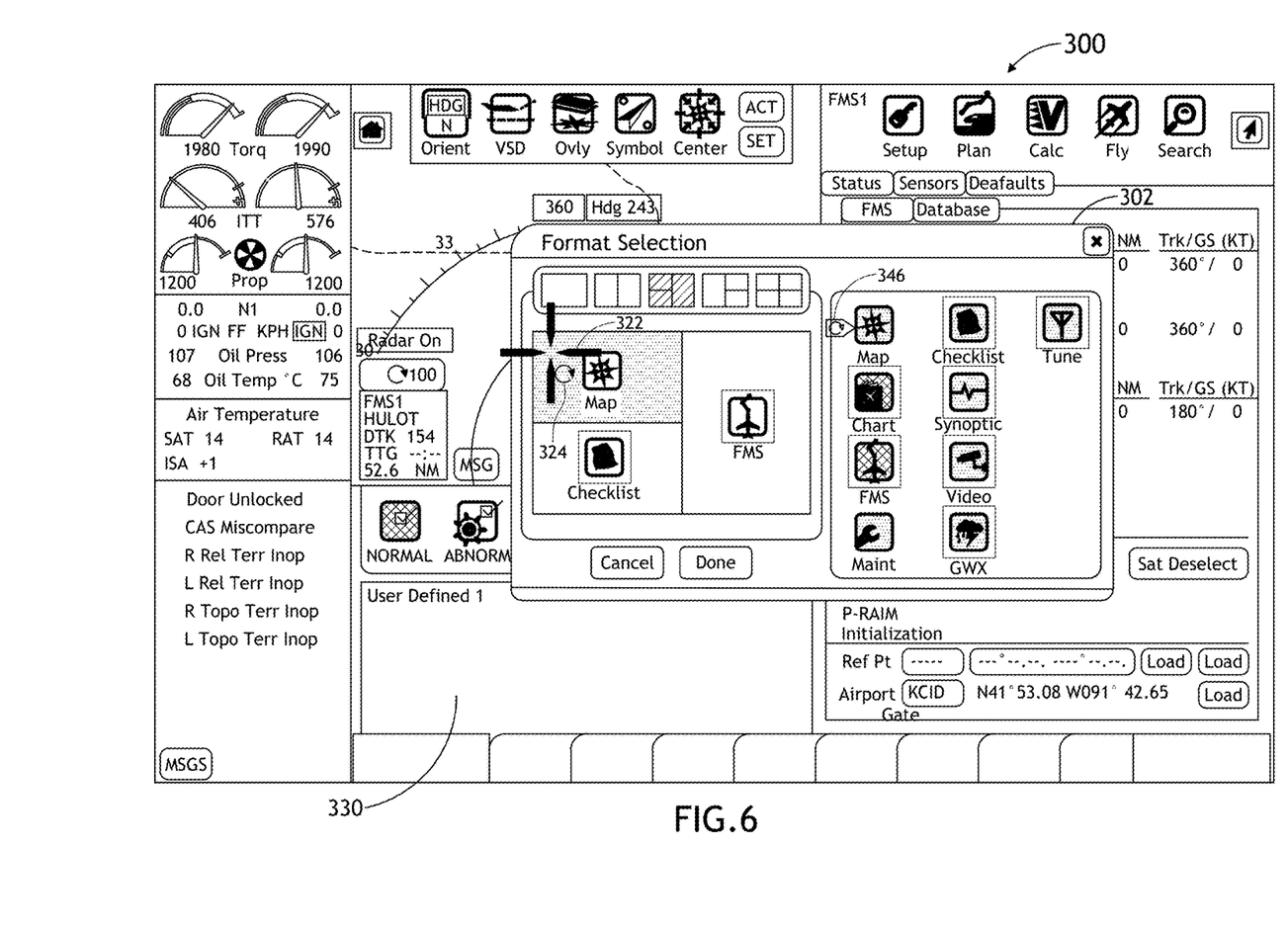
FIG. 6 is a view of a two quarters and half window layout of a graphical user interface including a preview of a mapping application, a flight management system, and an electronic checklist.
Figure 7:
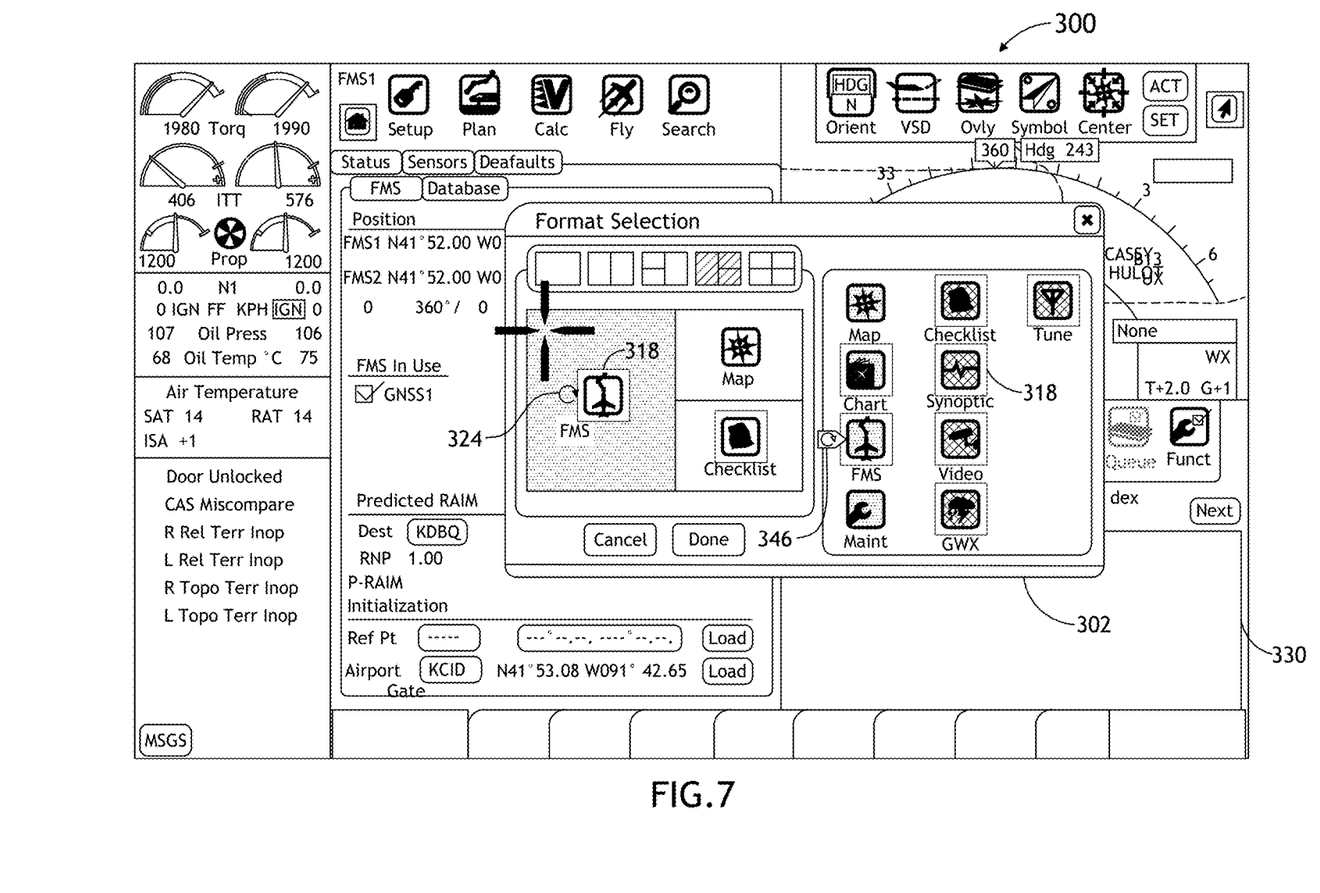
FIG. 7 is a view of a half and two quarters window layout of a graphical user interface including a preview of a mapping application, a flight management system, and an electronic checklist.
Figure 8:
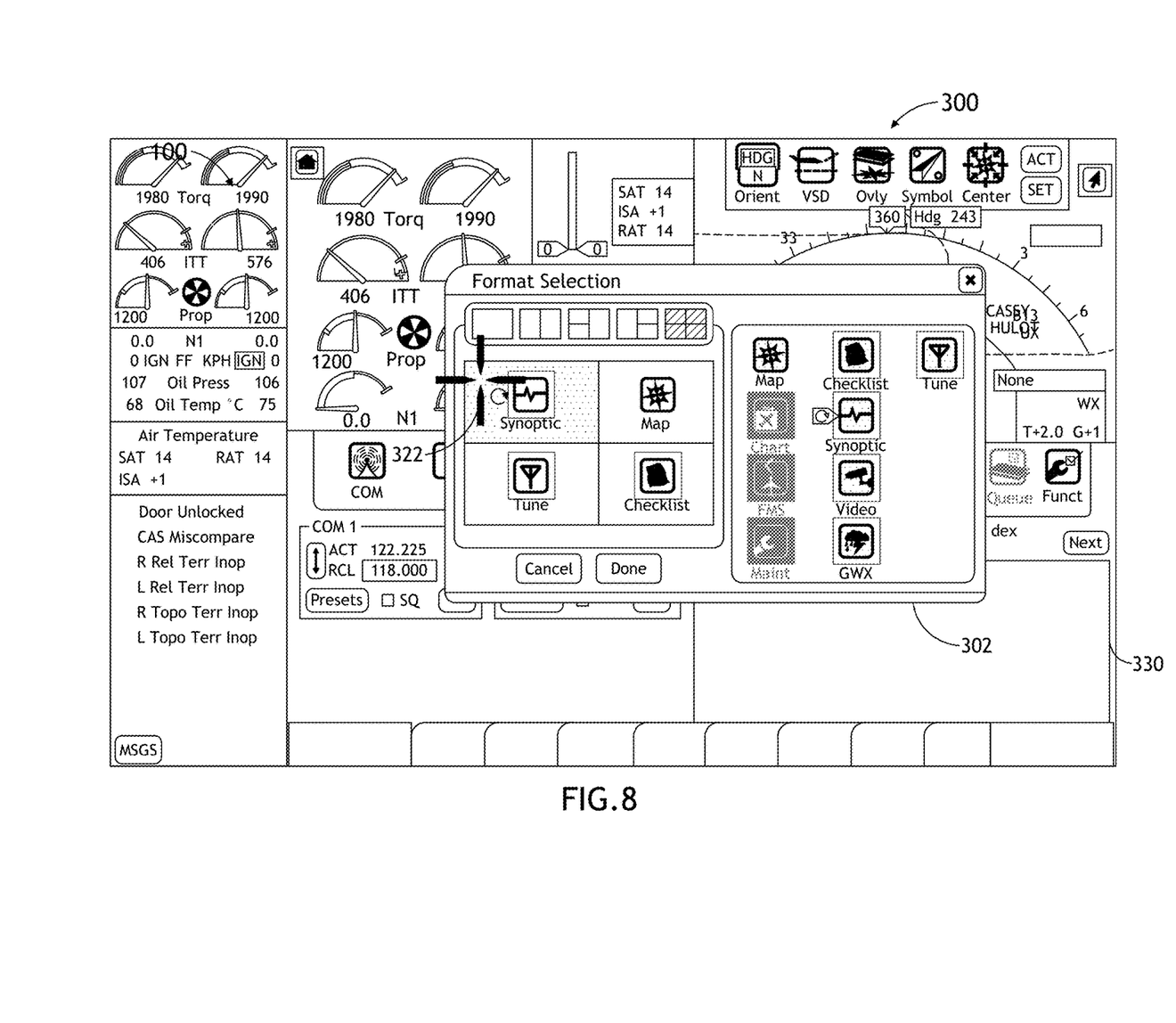
FIG. 8 is a view of a four quarter window layout of a graphical user interface including a preview of a synoptic application, a mapping application, a tune application, and an electronic checklist.

FIG. 5 also show the preview 330 function when the selected format 306 is a half screen layout. The selected applications include the mapping application and the flight management system. Behind the format selection box 302, the mapping application is displayed in the left hand window 320 and the flight management system is displayed in the right hand window 320.

The preview 330 of the selected applications that is shown in FIGS. 4-8 may be displayed before a user is required to confirm the changes to the layout and the selected applications. After the preview is displayed, the user may be prompted to accept the changes, or may decide to back out of the changes. If the user accepts the changes, then the selected layout option and the selected applications are adopted. If the user decides not to accept the changes, then the graphical display interface may revert back to a most recent layout option and application. For example, the format selection window 302 may include a cancel button 326 that the user may select to cancel the selections, or a done button 328 to accept the selections. These selections may be provided by a cursor control panel in one embodiment, or any other suitable input device.

The graphical user interface 300 may also provide feedback to the user regarding selections by modifying the appearance of different elements shown on the graphical interface 300. For example, if a user attempts to select an icon 318 and move it to a window 320 where the icon is incompatible (for example, if the user tries to move an icon 318 to a half window of a two quarters one half layout 310 when the icon 318 is compatible in the quarter window only), the area corresponding to the quarter window(s) may change to a grey color to show the user that the selection is not valid. The area corresponding to the half window portion of the two quarters and one half layout 310 may not change colors in order to indicate it is a valid selection.

An additional feature of the graphical user interface 300 may include a swapping feature. The swapping feature may provide for the scenario when a user selects two instances of a single application to run on the graphical interface by selecting the same icon type twice. The graphical user interface 300 may be configured to swap a current application for the selected application in such an instance, according to a set of rules. For example, in FIG. 3, if a user tries to select the map icon from the right and move it into the lower quarter of the window 320 where the tune icon 318 is currently located, the graphical user interface 300 may be configured to accept the placement of the map icon where the user has placed it. However, since the user is already running the map application in the upper quarter, the graphical user interface 300 may swap a closest icon (in this case, tune is considered to be closest) into the window where the first (or prior) instance of the doubly selected icon is located. For example, in FIG. 3, when the user tries to select a second instance of map and place it in the lower quarter, the selection will be accepted and the mapping icon will be moved into the selected window, however, the tune icon will be moved into the upper left quarter window. While this particular example is described, those skilled in the art will appreciate that the swapping feature may be applied according to any desired hierarchy or set of rules for which applications may be swapped within particular windows.

An additional feature of the graphical user interface 300 may include an application retention feature. In this feature, a user may seek to change the layout while running one or more applications. The application retention feature may provide that one or more of the currently running applications may still be displayed in a window of the newly selected format. For example, if a user is currently running a full window 306 layout with a mapping application and the user wants to switch to a two half windows layout 308, the graphical user interface 300 may present the mapping application in one of the half windows of the two half windows layout 308.

The graphical user interface 300 is configured to provide feedback to the user in response to user selections. The feedback may be provided before a selection is made or after a selection is made or attempted. Feedback may be provided in a variety of manners in the graphical user interface 300, by highlighting items, modifying the color and appearance of elements of the display, and the like. For example, the first arrow 324 and the second arrow 326 may be displayed to help a user make selections. Similarly, the graphical user interface 300 may also provide feedback about a user selection via a consequence generator feature. For example, if a user selects an icon 318 that is incompatible with the selected window 320, the icon may "snap back" from the window 320 where the user attempts to drop it and revert back to icon's original location. This provides a visual feedback to the user that the input was received by the graphical user interface 300, but the selected icon 318 is not compatible in that location. In addition, the graphical user interface 300 provides feedback by modifying the appearance of selection options within the graphical user interface 300, for example, by highlighting selections or greying out unavailable options.

The system and methods of the present disclosure may provide several advantages. For example, the graphical user interface may be used to configure an entire display in a single dialog box. The graphical user interface may provide the configuration in a graphical sense that provides graphical feedback in response to a user's selections and changes, rather than a list. In addition, the systems and methods of the present disclosure may simplify the process for configuring a multi-function graphical user interface. This may reduce pilot workload. Similarly, the system and methods of the present disclosure may provide feedback regarding the selected configuration. For example, a preview window of the selections may be provided before the user is required to commit to the selections. In addition, the system and methods of the present disclosure may provide feedback on selections by generating consequences, informing a user that a selection has been recognized but is incompatible with the configuration. The systems and methods of the present disclosure may support consistency of operation and reduced training time. In addition, the systems and methods of the present disclosure may reduce pilot workload and also the amount of heads-down operation required.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for managing a graphical interface viewable on a touch screen flight display, comprising:

presenting a main graphical interface on the touch screen flight display;

presenting a format selection graphical interface box in front of the main graphical interface on the touch screen flight display while the main graphical interface is displayed, wherein the format selection graphical interface box comprises a format selection graphical interface, a plurality of layout options each including one or more windows for the main graphical interface, and a plurality of icons associated with a plurality of aircraft operation applications being displayed simultaneously, wherein the plurality of layout options and the plurality of icons are displayed in separate areas of the format selection graphical interface box;

receiving a selection of a layout option from the plurality of layout options, wherein the plurality of layout options remain displayed in the format selection graphical interface box following the selection of the layout option;

presenting a preview of the selected layout option in the format selection graphical interface displayed in the format selection graphical interface and presenting the selected layout option in the main graphical interface behind the format selection graphical interface box, wherein the selected layout option is previewed in the format selection graphical interface and presented in the main graphical interface prior to adopting the selected layout option;

receiving a selection of an icon of the plurality of icons, wherein the selected icon is presented within a window of the one or more windows of the selected layout option previewed in the format selection graphical interface, wherein the plurality of icons remain displayed in the format selection graphical interface box following the selection of the icon, wherein the selected icon is associated with a selected aircraft operation application of the plurality of aircraft operation applications; and presenting an incompatibility indicator in the format selection graphical interface to communicate the incompatibility of the selected icon with the selected layout option.

2. The method as claimed in claim 1, further comprising:
presenting the selected icon within a window of the one or more windows of the selected layout option previewed in the format selection graphical interface and substantially simultaneously presenting the selected aircraft operation application associated with the selected icon within a window of the one or more windows of the selected layout option presented in the main graphical interface,
wherein the window of the selected layout option previewed in the format selection graphical interface in which the selected icon is presented is the same window as the window of the selected layout option presented in the main graphical interface in which the selected aircraft operation application associated with the selected icon is substantially simultaneously presented.

3. The method as claimed in claim 2, further comprising:
prompting for one of: an acceptance or a rejection of the selected layout option and the selected icon;
adopting the selected layout option and the application associated with the selected icon when an acceptance is received; and
reverting to a most recent layout and application when a rejection is received.

4. The method as claimed in claim 1, wherein the plurality of layout options includes at least one of: a full window layout, a half window layout, a two quarter and half window layout, a half and two quarter window layout, and a four quarter window layout.

5. The method as claimed in claim 1, further comprising:
enabling an icon of the plurality of icons when the icon is compatible with the selected layout option; and
disabling an icon of the plurality of icons when the icon is not compatible with the selected layout option.

6. The method as claimed in claim 5, wherein the selected layout option includes at least two windows.

7. The method as claimed in claim 6, further comprising:
receiving a selection of a first window in the selected layout option for displaying the selected icon.

8. The method as claimed in claim 7, further comprising:
modifying an appearance of an icon of the plurality of icons when the icon is compatible in a second window of the selected layout option.

9. The method as claimed in claim 8, further comprising:
receiving a selection of the second window in the selected layout option; and
receiving a selection of a second icon for display within the second window.

10. The method as claimed in claim 1, wherein the one or more aircraft operation applications include at least one of: a mapping application, an aircraft checklist application, a tuning application, a chart application, a synoptic application, a Controller-Pilot Data Link Communication application, a flight management system application, a video application, a data link application, a maintenance application, a document reader application, a Primary Flight Display (PFD) application, or a graphical weather application.

11. The method as claimed in claim 1, wherein at least one of receiving the selection of the layout option or receiving the selection of the icon includes receiving a selection via at least one of: a touch-touch selection or a touch and drag selection.

12. A system, comprising:
a processor;
a memory, the memory in communication with the processor;
a touch screen flight display, the display in communication with the memory and the processor;
a computer executable program code stored on the memory, the computer executable program code configured to execute on the processor,
the computer executable program code further configured to cause the processor to:
present a main graphical interface on the touch screen flight display;
present a format selection graphical interface box in front of the main graphical interface on the touch screen flight display while the main graphical interface is displayed, wherein the format selection graphical interface box comprises a format selection graphical interface, a plurality of layout options each including one or more windows for the main graphical interface, and a plurality of icons associated with a plurality of aircraft operation applications being displayed simultaneously, wherein the plurality of layout options and the plurality of icons are displayed in separate areas of the format selection graphical interface box;
receive a selection of a layout option from the plurality of layout options, wherein the plurality of layout options remain displayed in the format selection graphical interface box following the selection of the layout option;
present a preview of the selected layout option in the format selection graphical interface displayed in the format selection graphical interface box and present the selected layout option in the main graphical interface behind the format selection graphical interface box, wherein the selected layout option is previewed in the format selection graphical interface and presented in the main graphical interface prior to adopting the selected layout option;
receive a selection of an icon of the plurality of icons, wherein the selected icon is presented within a window of the one or more windows of the selected layout option previewed in the format selection graphical interface displayed in the format selection graphical interface box, wherein the plurality of icons remain displayed in the format selection graphical interface box following the selection of the icon, wherein the selected icon is associated with a selected aircraft operation application of the plurality of aircraft operation applications; and
presenting an incompatibility indicator in the format selection graphical interface to communicate the incompatibility of the selected icon with the selected layout option.

13. The system as claimed in claim 12, wherein the computer executable program code is further configured to:
present the selected icon within a window of the one or more windows of the selected layout option previewed in the format selection graphical interface and substantially simultaneously present the selected aircraft operation application associated with the selected icon within a window of the one or more windows of the selected layout option presented in the main graphical interface,
wherein the window of the selected layout option previewed in the format selection graphical interface in which the selected icon is presented is the same window as the window of the selected layout option presented in the main graphical interface in which the selected aircraft operation application associated with the selected icon is substantially simultaneously presented.

14. The system as claimed in claim 12, wherein the computer executable program code is further configured to:
prompt for one of: an acceptance or a rejection of the selected layout option and the selected icon;
adopt the selected layout option and the application associated with the selected icon when an acceptance is received; and
revert to a most recent layout and application when a rejection is received.

15. The system as claimed in claim 12, wherein the plurality of layout options includes at least one of: a full window layout, a half window layout, a two quarter and half window layout, a half and two quarter window layout, and a four quarter window layout.

16. The system as claimed in claim 12, wherein the computer executable program code is further configured to:
enable an icon of the plurality of icons when the icon is compatible with the selected layout option; and
disable an icon of the plurality of icons when the icon is not compatible with the selected layout option.

17. A non-transitory computer-readable device having computer-executable instructions for performing a method for managing a graphical interface viewable on a touch screen flight display, the instructions comprising:
presenting a main graphical interface on the touch screen flight display;
presenting a format selection graphical interface box in front of the main graphical interface on the touch screen flight display while the main graphical interface is displayed, wherein the format selection graphical interface box comprising a format selection graphical interface, a plurality of layout options each including one or more windows for the main graphical interface, and a plurality of icons associated with a plurality of aircraft operation applications being displayed simultaneously, wherein the plurality of layout options and the plurality of icons are displayed in separate areas of the format selection graphical interface box;
receiving a selection of a layout option from the plurality of layout options, wherein the plurality of layout options remain displayed in the format selection graphical interface box following the selection of the layout option;
presenting a preview of the selected layout option in the format selection graphical interface displayed in the format selection graphical interface box and presenting the selected layout option in the main graphical interface behind the format selection graphical interface box, wherein the selected layout option is previewed in the format selection graphical interface and presented in the main graphical interface prior to adopting the selected layout option;
receiving a selection of an icon of the plurality of icons, wherein the selected icon is presented within a window of the one or more windows of the selected layout option previewed in the format selection graphical interface displayed in the format selection graphical interface box, wherein the plurality of icons remain displayed in the format selection graphical interface box following the selection of the icon, wherein the selected icon is associated with a selected aircraft operation application of the plurality of aircraft operation applications; and
presenting an incompatibility indicator in the format selection graphical interface to communicate the incompatibility of the selected icon with the selected layout option.

18. The device as claimed in claim 17, the instructions further comprising:
presenting the selected icon within a window of the one or more windows of the selected layout option previewed in the format selection graphical interface and substantially simultaneously presenting the selected aircraft operation application associated with the selected icon within a window of the one or more windows of the selected layout option presented in the main graphical interface,
wherein the window of the selected layout option previewed in the format selection graphical interface in which the selected icon is presented is the same window as the window of the selected layout option presented in the main graphical interface in which the selected aircraft operation application associated with the selected icon is substantially simultaneously presented.

* * * * *